United States Patent
Morabit

(10) Patent No.: US 9,883,628 B2
(45) Date of Patent: *Feb. 6, 2018

(54) ANTI-WIND/ANTI-WRAPPING ASSEMBLY FOR TRIMMERS

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,196

(22) Filed: Dec. 1, 2015

(65) Prior Publication Data
US 2016/0150725 A1 Jun. 2, 2016

Related U.S. Application Data

(60) Provisional application No. 62/085,983, filed on Dec. 1, 2014.

(51) Int. Cl.
*A01D 34/416* (2006.01)

(52) U.S. Cl.
CPC .................. *A01D 34/4165* (2013.01)

(58) Field of Classification Search
CPC ............... A01D 34/4165; A01D 34/4167
USPC ........................................................ 30/276
See application file for complete search history.

(56) References Cited

U.S. PATENT DOCUMENTS

| | | | | |
|---|---|---|---|---|
| 2,708,820 A * | 5/1955 | Britten | ................. | A01D 34/003 56/13.7 |
| 4,707,919 A * | 11/1987 | Tsuchiya | ................. | A01G 3/06 30/276 |
| 5,103,561 A * | 4/1992 | Harada | ................. | A01D 34/90 30/276 |
| 5,365,724 A * | 11/1994 | Wagner | ................. | A01D 75/18 56/12.1 |
| 5,414,934 A * | 5/1995 | Schlessmann | ....... | A01D 34/902 30/275.4 |
| 5,743,019 A * | 4/1998 | Berfield | ............. | A01D 34/4161 242/564 |
| 5,906,051 A * | 5/1999 | Nannen | ............... | A01D 34/4163 30/276 |
| 6,971,223 B2 * | 12/2005 | Scott | ..................... | A01D 34/74 30/276 |
| 7,302,790 B2 * | 12/2007 | Brandon | ............ | A01D 34/4166 56/12.7 |
| 7,467,470 B2 * | 12/2008 | Robison | ............... | A01D 34/416 242/388 |

(Continued)

*Primary Examiner* — Hwei C Payer
(74) *Attorney, Agent, or Firm* — Nixon & Vanderhye P.C.

(57) ABSTRACT

An anti-winding assembly reduces or prevents debris from winding on a trimmer and/or makes them easier to remove. The trimmer includes a trimmer head mounted to a rotatable arbor and supporting one or more cutting lines. The anti-winding assembly includes a bearing positionable between the trimmer head and an adjacent trimmer component. The bearing includes a freely rotating outer race. A shield positioned radially outward of the bearing adjacent the outer race shields gaps between the bearing and the trimmer head and between the bearing and the adjacent trimmer component. The anti-winding assembly prevents trimmed debris from being wound up near the trimmer head.

16 Claims, 9 Drawing Sheets

(56) References Cited

U.S. PATENT DOCUMENTS

| | | | |
|---|---|---|---|
| 7,827,771 B2* | 11/2010 | Hishida | A01D 34/902 30/276 |
| 8,418,370 B2* | 4/2013 | Hoelscher | A01D 34/90 30/276 |
| 8,607,461 B2* | 12/2013 | Miyahara | A01D 34/90 30/276 |
| 2014/0338202 A1* | 11/2014 | Morabit | A01D 34/902 30/275.4 |
| 2016/0143219 A1* | 5/2016 | Yuan | A01D 34/4165 30/276 |
| 2016/0150725 A1* | 6/2016 | Morabit | A01D 34/4165 30/276 |
| 2016/0330902 A1* | 11/2016 | Morabit | A01D 34/4167 |

* cited by examiner

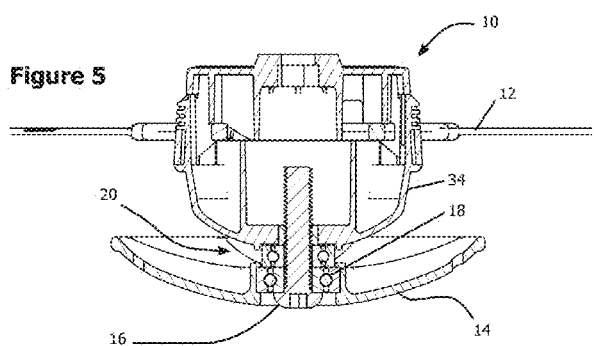
Figure 5
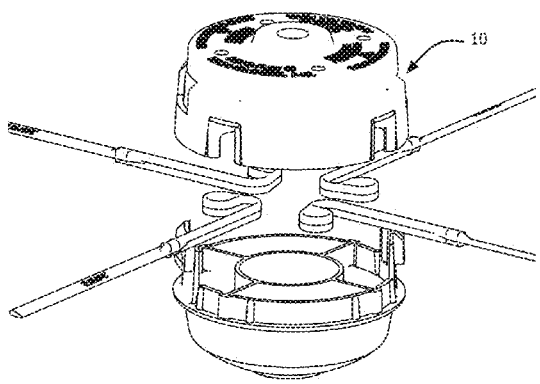
Figure 5A
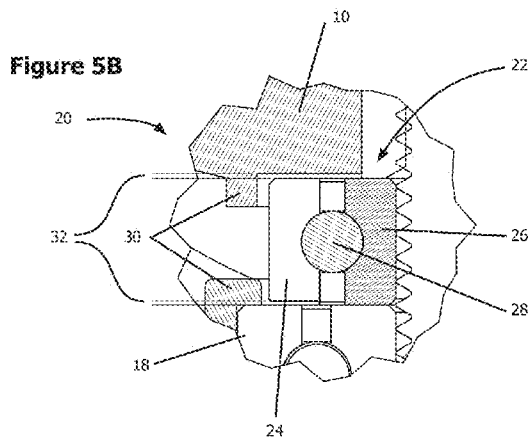
Figure 5B
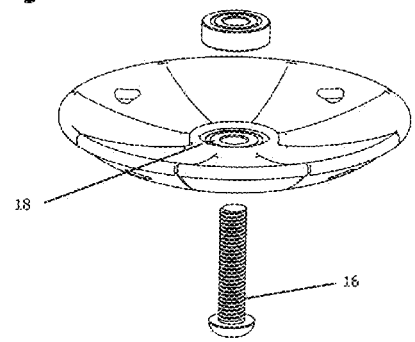
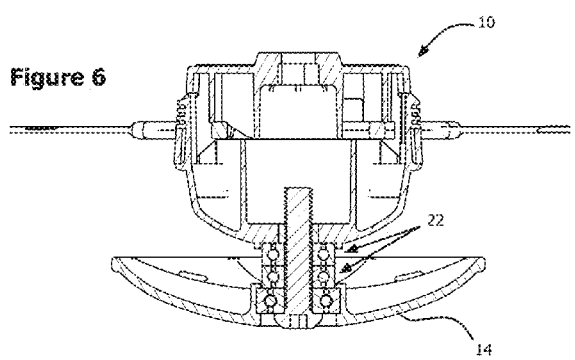
Figure 6
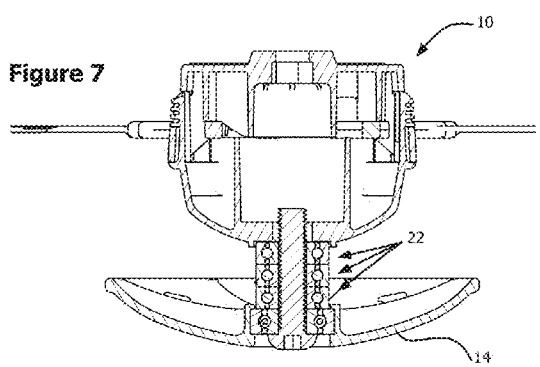
Figure 7

Figure 12
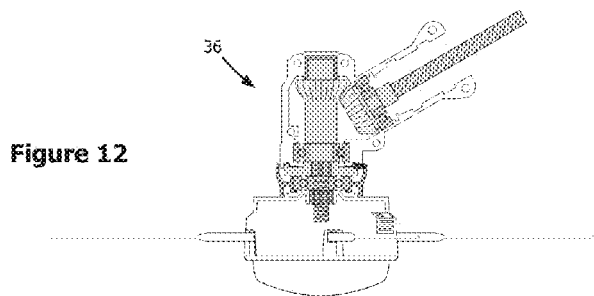
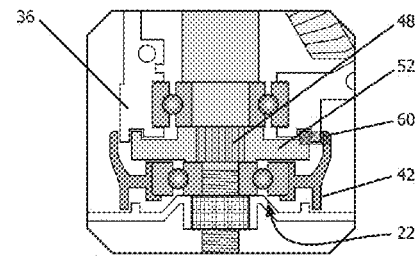
Figure 12A
Figure 13
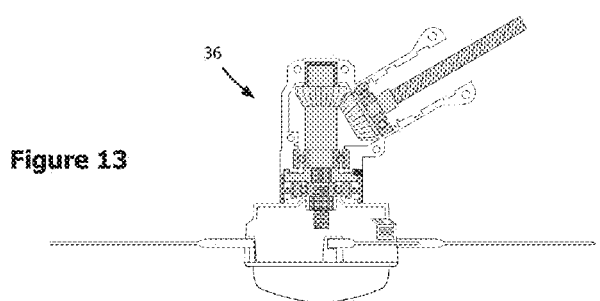
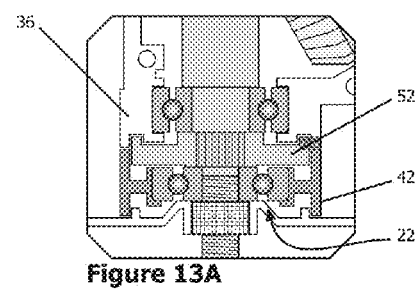
Figure 13A
Figure 14
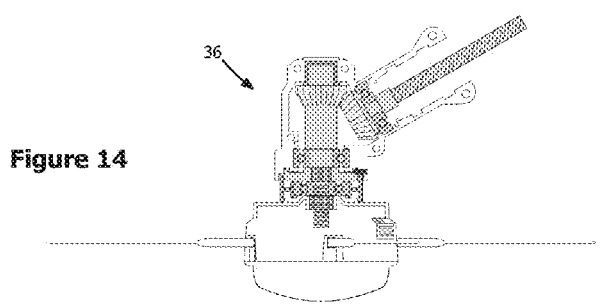
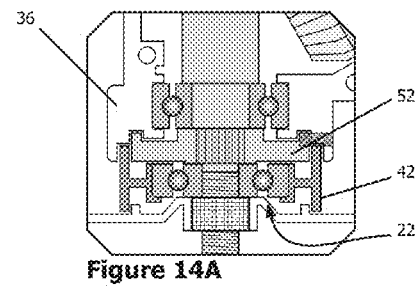
Figure 14A
Figure 15
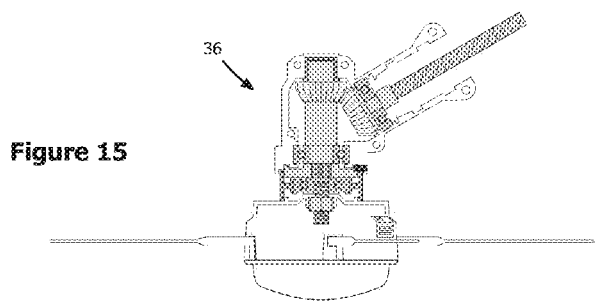
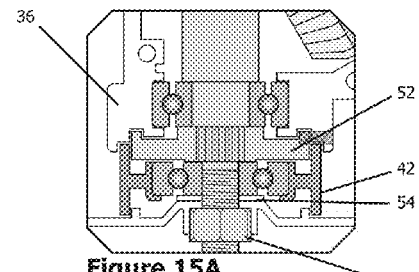
Figure 15A
Figure 16
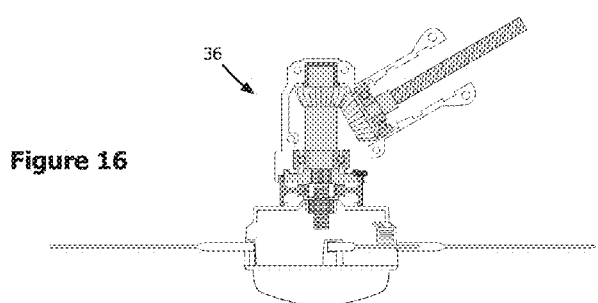
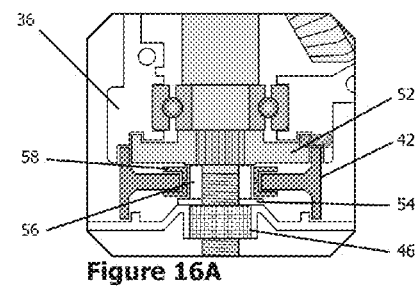
Figure 16A

ANTI-WIND/ANTI-WRAPPING ASSEMBLY FOR TRIMMERS

CROSS-REFERENCES TO RELATED APPLICATIONS

This application claims the benefit of U.S. Provisional Patent Application No. 62/085,983, filed Dec. 1, 2014, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to flexible line trimmers and brush cutters and, more particularly, to an anti-wind/wrapping assembly that prevents trimmed debris from winding on a trimmer.

One of the most irritating experiences when cutting into higher or taller vegetation with a common flexible line trimmer or brush cutter is the wrapping of long strands of vegetation around the axis of rotation of the rotating head. It also applies to vines, or previously cut vegetation lying on the ground. Additionally, it is not uncommon to run into invisible monofilament fishing line, often left along lake banks and streams that rapidly and very effectively snarls a trimmer head into a stalled rotation. As these strands become entangled within the trimmer head's openings and crevices, the debris winds with rotation, and accumulates into a massive bundle to then fill the open volume, and to reach adjacent stationary structure of the trimmer body. The wrappings rapidly bind and stall the rotating head from turning. During the binding process, unless the operator fails to shut down the rotation by releasing the trigger, heat builds up on the rotating or even the stationary parts to cause melting and structural damage to the components, thus often destroying the system.

When severed at their base, long vegetation cuttings (strands) drop onto the rotating parts below, and then are carried along with the rotation. There are numerous scenarios regarding how the debris can be presented to the trimmer head areas. One end of the long debris pinches or binds onto the rotating shaft, or its direct attachment, which is under power from the driving motor. The continued powering and tightening of the strands forcefully wind and wrap the debris around and/or between each other to accumulate, and to become tighter and tighter. The accumulating snarl continues to rotate until it hits an obstruction (the connecting housings and components in the area) to then bind the entire system from turning.

The degree of bind can vary, but there will more likely be heavy vibration forces due to the imbalance of the wrapped mass to create further trimmer damage. Certainly, vibratory forces become risky to the operator who is trying to control the system which is now way out of balance. When combining the problematic imbalance with heat accumulation, it further results in more undesirable and destructive forces as well as melting damage to plastic or non-metallic components.

In all cases, the operator must inconveniently stop working by shutting down the trimmer to physically remove the compacted snarl of strands from the exposed rotating parts. FIG. 1 shows an exemplary trimmer with trimmed debris being wound into the space between the trimmer head and a gear box housing. FIGS. 2-4 show an exemplary trimmer including a glider disk, with trimmed debris being wound into the space between the trimmer head and the glider disk. Most times, the wrappings are so tightly compressed they cannot be removed by hand, nor can the snarl be removed even with needle-nose pliers. As a result of this locked and snarled system, the operator may use a sharp cutting knife to cut through the tightened snarl. Often it may be best to remove the bound debris from the trimmer with a full disassembly of the head components from the trimmer. This is a common nuisance and severe weakness of the trimmer or brush cutter.

As a preventive method (when possible), users are often advised to cut long and tall vegetation from the top down to achieve shorter segments that are less likely to wrap. While this hand-supported trimmer procedure may be helpful, it is counter to the purpose of a trimmer machine (especially with flexible line blade cutters) that may be ground supported, or more intended to cut lengthy or tall vegetation close to the ground. Therefore, while nuisance winding is a severe problem when it occurs above the head, there is an added need to prevent or reduce winding when using a ground supported trimmer glider system that utilizes a lower end 'free-wheeling' disc to be less vulnerable to the problems of accumulated windings that would likely occur above the head, or below the head (between the glider and the head). An exemplary glider system is described in copending U.S. patent application Ser. No. 14/280,916, the contents of which are hereby incorporated by reference.

Some trimmers may be equipped with a thin metal spacer plate between the head and the upper geometry structure, which reduces the pinching gaps where the long debris can pinch fibrous debris to then begin its power winding. This plate is also part of a system design that reduces the 'fill volume' above the head where the snarled bundle would fill. Reducing the volume directly above the head and reducing the pinch points are beneficial, but only reduce some of the accumulation probability because once a strand begins to pinch, it will wind into a tightened snarl.

The glider (a free-wheeling disc mounted below the head) enables a trimmer to be ground supported (below the cutting plane). It is also more susceptible to winding and wrapping as it promotes resting the trimmer on the ground to effectively 'rotary mow' with a flexible series of line blades. This new method of using a trimmer encourages cutting long and tall vegetation at the base and close to the ground. Therefore, the new method becomes even more vulnerable for debris to then drop down directly onto the rotating head and glider mechanisms to then wrap and bind at either the location above the head or below the head between the head and the glider. Therefore, a ground supported trimmer can be expected to have more exposure to wrapping potentials than a hand-supported trimmer. More likely, a handheld trimmer would not be cutting as low to the ground as frequently as would be a glider system.

While further analyzing the accumulation volume between the head and glider plate, there is a diminishing opening or pocket from outside in toward the center of the glider rotation. This volume is subject to the accumulation of dropping strands making it even more vulnerable to accumulate the undesirable debris.

BRIEF SUMMARY OF THE INVENTION

It has been discovered that winding and wrapping can be substantially mitigated by shielding the gaps that pinch the debris and by isolating the sources of rotation that create the winding. The device of the preferred embodiments utilizes a roller, ball or sleeve bearing or the like that separates or isolates the rotating head from a strand or bundle of accumulated debris. The outer race or outer surface of the bearing is free to rotate, and power to the strand is thus disconnected, therefore enabling the strand of vegetation or debris to remain in a more static condition. Even if some winding were to occur, the winding is prevented from being wound tightly enabling easy removal. A shield associated with the bearing further serves to cover pinching gaps between the bearing and the trimmer head as well as between the bearing and adjacent trimmer components.

In an exemplary embodiment, an anti-winding assembly prevents debris from winding on a trimmer. The trimmer includes a trimmer head mounted to a rotatable arbor and supporting one or more cutting lines. The anti-winding assembly includes a bearing positionable between the trimmer head and an adjacent trimmer component. The bearing includes a freely rotating outer race. A shield positioned radially outward of the bearing adjacent the outer race covers pinching gaps between the bearing and the trimmer head and between the bearing and the adjacent trimmer component.

The bearing may include an inner race connectable to the rotatable arbor, where the outer race is rotatable relative to the inner race. The shield may be integral with a trimmer head cover. In this context, the shield may include a first ring integral with the trimmer head cover and a second ring integral with the adjacent trimmer component. The trimmer component may be a glider disk rotatably mounted to a distal end of the trimmer head. In this arrangement, the anti-winding assembly may include a plurality of bearings stacked between the trimmer head and the glider disk, where the plurality of bearings act as spacers to adjust a trimming height.

The shield may be connected to the outer race. The trimmer component may include an arbor gear box housing, a direct drive motor, or a direct cable drive system without a gearbox, where the shield may include a shield member cooperatively engaged with the gear box housing. The shield member may engage an outside gap surface of the gear box housing, overlapping ends of the gear box housing. The shield member may engage an inside surface of the gear box housing, where ends of the gear box housing overlap the shield member. The shield member may be engaged with the gear box housing in a butt joint with ends of the gear box housing.

In another exemplary embodiment, a trimmer includes a rotating trimmer head, at least one cutting line coupled with the trimmer head, a trimmer component disposed adjacent the trimmer head, and the anti-winding assembly that substantially reduces debris from winding between the trimmer head and the trimmer component. The trimmer component may include a glider disk rotatably mounted on a ground side of the trimmer head and a drive box housing disposed on an opposite side of the trimmer head. In this context, the trimmer may include two anti-winding assemblies respectively acting between the glider disk and the trimmer head and between the drive box housing and the trimmer head.

In yet another exemplary embodiment, a trimmer includes a motor driven rotating trimmer head, at least one cutting line coupled with the trimmer head, a glider disk disposed on a ground side of the trimmer head, and a first anti-winding assembly positioned between the trimmer head and the glider disk. The first anti-winding assembly may include a first bearing positioned between the trimmer head and the glider disk, where the first bearing has a freely rotating outer race, and a first shield or circular ledge positioned radially outward of the first bearing adjacent the outer race, where the first shield covers gaps between the first bearing and the trimmer head and between the first bearing and the glider disk. The trimmer may further incorporate a drive box housing disposed on a handle side of the trimmer head, and a second anti-winding assembly positioned between the trimmer head and the drive box housing.

BRIEF DESCRIPTION OF THE DRAWINGS

These and other aspects and advantages will be described in detail with reference to the accompanying drawings, in which:

FIGS. 5-5B show the anti-winding assembly with an exemplary trimmer application having a glider disk;

FIGS. 6 and 7 show the use of the anti-winding assembly for adjusting a trimming height with the glider disk;

FIGS. 8-8B show the anti-winding assembly between the trimming head and a gearbox housing;

FIGS. 9-16A illustrate alternative embodiments of the anti-winding assembly;

DETAILED DESCRIPTION OF THE INVENTION

Figure 1:
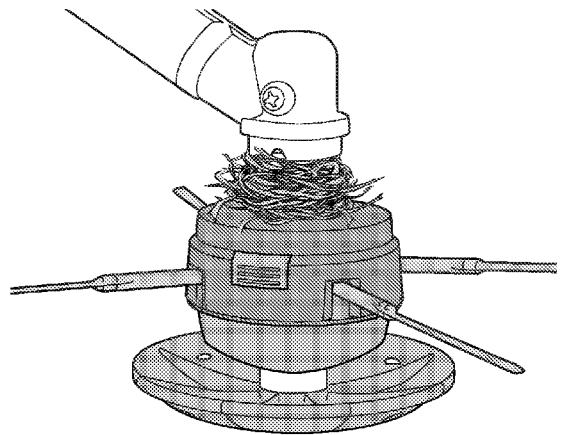
FIGS. 1-4 illustrate a problem that occurs with rotating trimmers.
Figure 2:
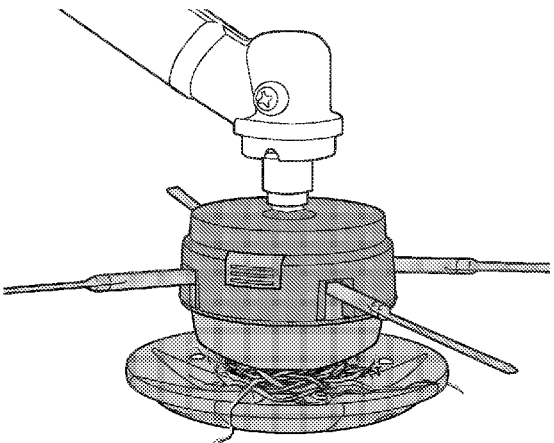
Figure 3:
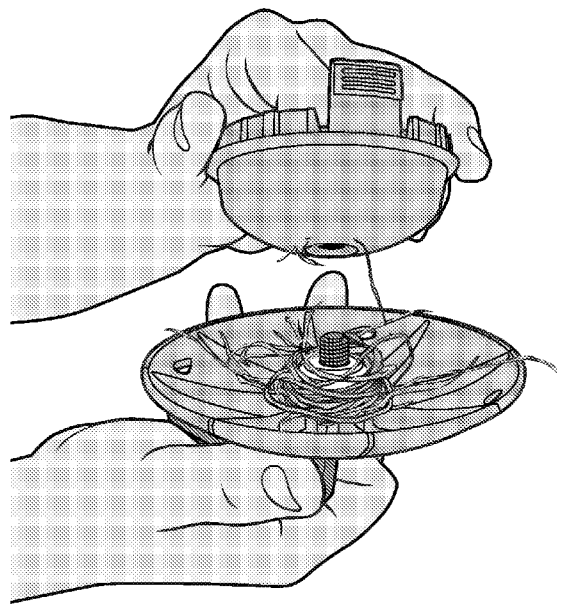
Figure 4:
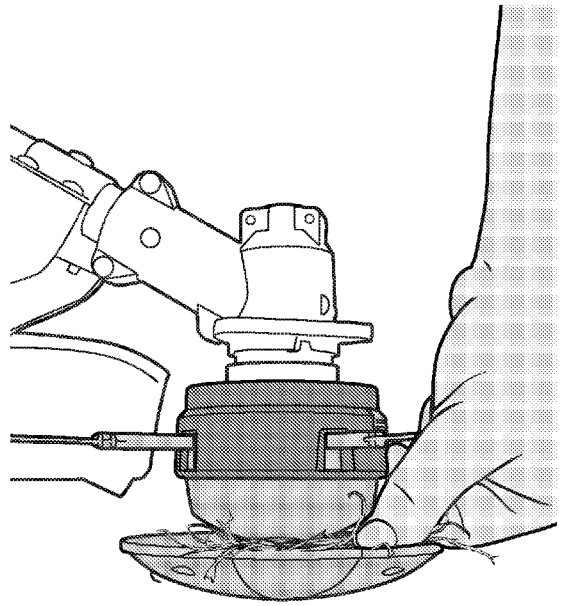

With reference to FIGS. 5-7, a first exemplary application of the anti-winding assembly will be described in conjunction with a trimmer that incorporates a glider disk such as the glider disk described in the noted co-pending U.S. patent application. A trimmer head 10 is typically secured to a rotatable arbor (not shown in FIG. 5) and supports one or more cutting lines 12. The cutting lines 12 shown in the figures are exemplary molded lines with aerodynamic cross-sections available from Aero-Flex Technologies of Rock Hill, S.C. The cutting lines may also be common monofilament cutting line.

The glider disk 14 is attached to the trimmer head 10 via a bolt 16 or the like through a glider bearing 18. The anti-winding assembly 20 is positioned in the gap between the glider disk 14 and the trimmer head 10.

The anti-winding assembly 20 includes a bearing 22 positionable between the trimmer head 10 and the glider disk 14. The bearing includes a freely rotating outer race 24 and an inner race 26 connected to the rotating arbor. A bearing member 28 such as a ball, needle or sleeve bearing member is disposed between the freely rotating outer race 24 and the inner race 26. The anti-winding assembly 20 also includes one or more shields or ledges 30 positioned radially outward of the bearing 22 adjacent the outer race 24. The shields 30 cover gaps 32 between the bearing 22 and the bottom of the trimmer head 10 and between the bearing 22 and the glider plate 14. In the embodiment shown in FIGS. 5-7, the shield 30 may be integral with a head cover 34 of the trimmer head 10. The shield may also be integral with the glider disk 14. As shown, the shield 30 forms part of the bracket of the glider disk 14 that secures the glider disk 14 to the glider bearing 18. The shields 30 may form a first ring integral with the trimmer head cover 34 and a second ring integral with the glider disk 14.

FIGS. 6 and 7 show the use of multiple bearings 22 stacked between the trimmer head 10 and the glider disk 14. The bearings 22 act as spacers to adjust a trimming height of the trimmer. That is, in use, the glider disk is intended to engage the ground to support the trimmer during a trimming operation. The bearings 22 serve to increase the space between the glider disk 14 and the trimmer head 10, thereby increasing a cutting height in the glider disk application.

Figure 8:
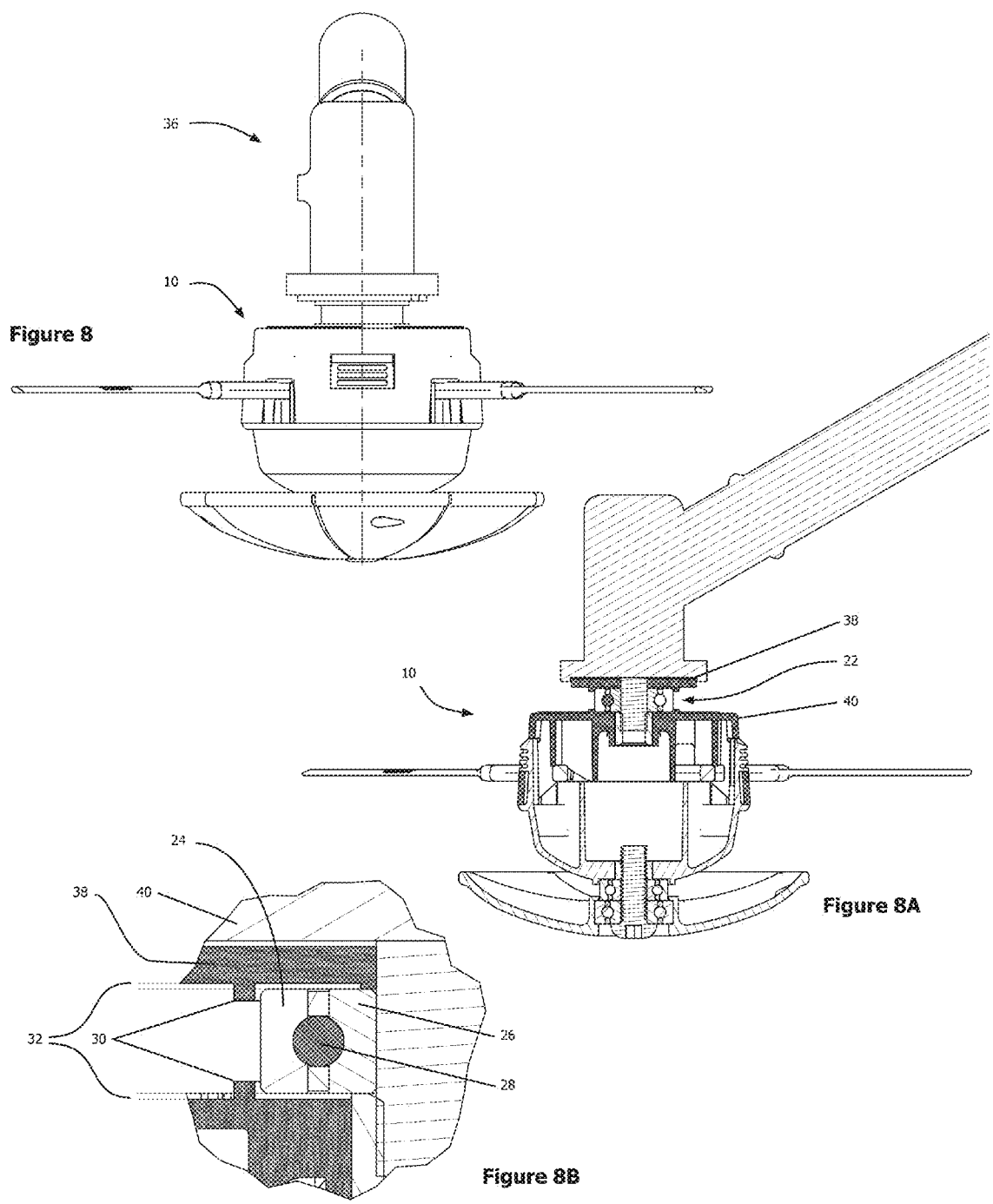

FIGS. 8-8B show an application of the anti-winding assembly in the space above the trimmer head 10 or between the trimmer head 10 and an upper component 36 such as an arbor gear box housing, a motor housing, a direct drive gear box housing, etc. As shown in FIGS. 8A and 8B, a shield plate 38 may be secured to the gear box housing 36, and the bearing 22 is interposed between the shield plate 38 and a top cover 40 of the trimmer head 10. The shield or circular ledge 30 may be formed integral with the shield plate 38 and the top cover 40 as shown in FIG. 8B. The shields 30 are positioned adjacent the gap 32 between the bearing and the shield cover plate 38 and between the bearing and the top cover 40 of the trimmer head.

Figure 9:
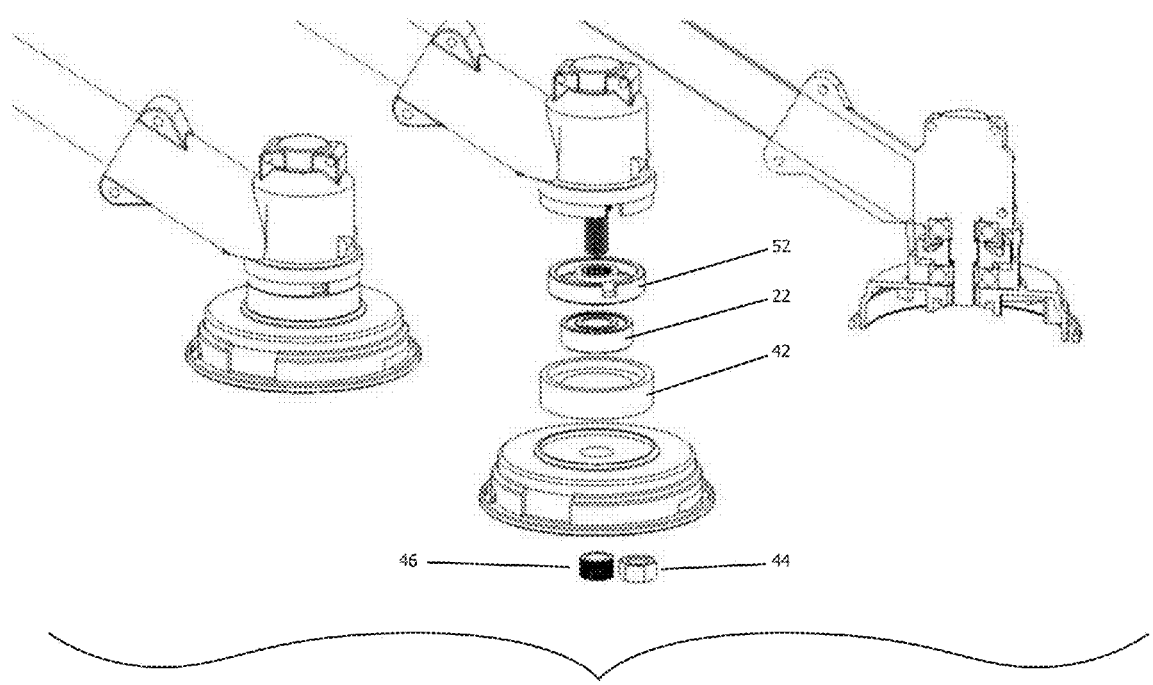

FIGS. 9-16A show variations on an embodiment with the shield 30 comprising a shield member 42 such as a slip ring or the like that is cooperatively engaged with the gear box housing 36 in various configurations. The shield member 42 may be secured to the outer race of the bearing 22 for free rotation with the outer race. The components can be assembled by sliding a lock washer 52 onto an arbor spline 48, followed by the combined shield member 42 and bearing 22. The top cover 40 of the trimmer head 10 is then secured to the arbor threads with fasteners such as a nut pocket 44 or a knurled threaded insert 46, which compress the subject parts into a rigid metal-to-metal assembly to assure a solid system without compression and to assure the surrounding parts resist collapse to interfere with the freewheeling operation of the shield member 42. FIGS. 9, 13 and 13A show the shield member 42 engaged with the gear box housing 36 in a butt joint with ends of the gear box housing. With reference to FIG. 13A, the arbor spline 48 and the lock washer 52 are used in conjunction with an inserting pin through a pin slot 60 to lock to hold the lock washer 52 and arbor shaft from turning while installing or removing the head to or from the arbor shaft threads. FIG. 13 also shows a locking pin hole 60. To assemble a brush cutter blade, the lock washer 52 is also used to assemble and pilot the metal blade at its central and to clamp the blade in concert with an outboard washer and nut. This heavy washer 52 rotates and is under power, and is thus a potential 'strand power winder' that should also be shielded by the shield member 42 or slip ring. Naturally, different manufacturers have differently designed and fitting splined lock washers.

Figure 10:
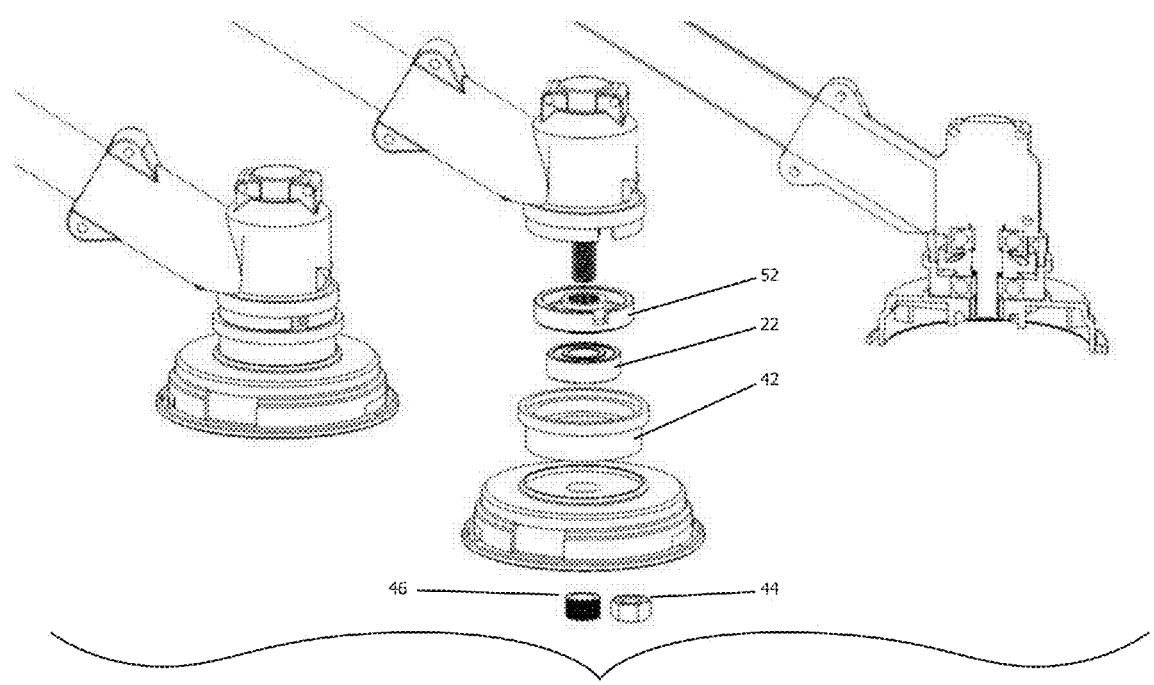
Figure 11:
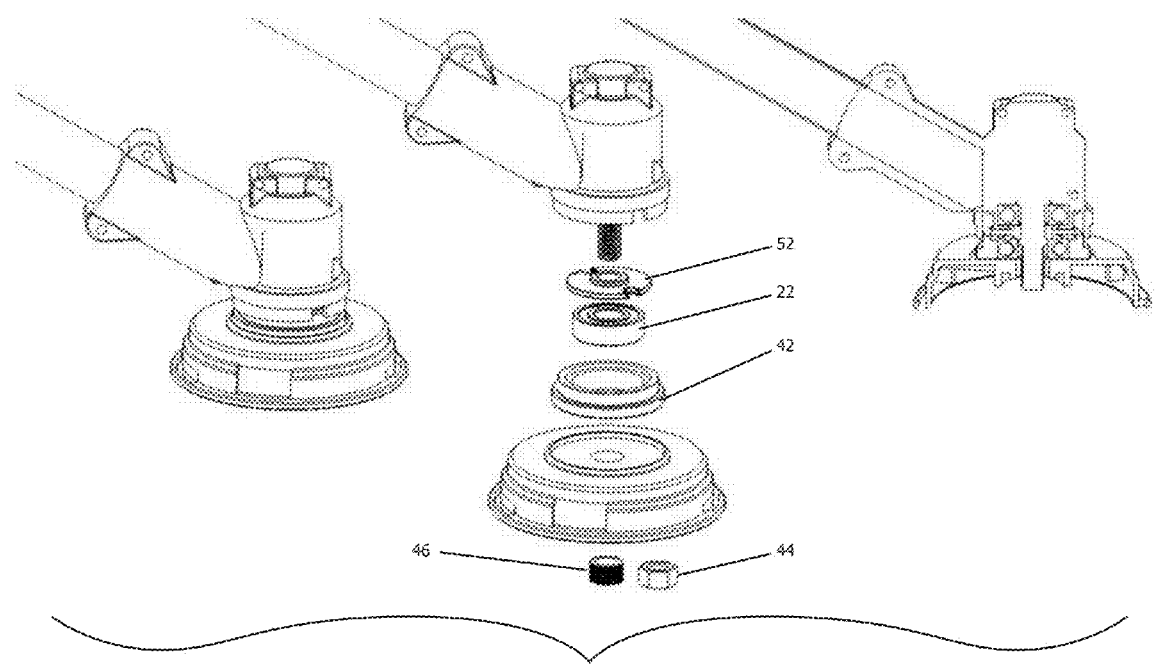

FIGS. 10, 12 and 12A show the shield member 42 engaging an outside surface of the gear box housing 36, overlapping ends of the gear box housing 36. FIGS. 11, 14 and 14A show the shield member 42 engaging an inside surface of the gear box housing 36 with ends of the gear box housing overlapping the shield member 42. FIGS. 15 and 15A show the shield member 42 and a nut pocket 44, and FIGS. 16 and 16A show the shield member 42 and a knurled threaded insert 46.

The shield member 42 in the form of a slip ring or the like may also be utilized with the glider system with minor modifications to the glider system design. For example, the glider system may incorporate shields or circular ledges on the cap and the glider, and a slip ring extension could be added to the outer race of the bearing in a similar way as the top system.

FIG. 15 references use of differently fitting and designed slip ring anti-wind systems that can be adapted to current trimmer models now on the market that include a nut pocket that enables a different nut to fit differently threaded arbors. This would be for an after-market product. There may be a plastic compression joint subject to plastic creep that requires a flat washer 54 and self-tightening threads. This is the only deviation from a metal to metal compression through the inner race connections.

FIG. 16 uses a metal spacer tube 56 as an inner race to allow use of a bushing 58 (in the diagram shown, a split flanged bushing) that rides and floats on the metal spacer 56 and metal washer 54 as bearing surfaces. This isolates an outer slip washer to be freewheeling. The design may utilize a nut pocket or a molded insert with a thread selected to fit a matching threaded arbor. This system, with the metal sleeve completes the metal to metal compression joint as a system, or if a nut pocket is used, the FIG. 15 design may be incorporated.

Figure 17:
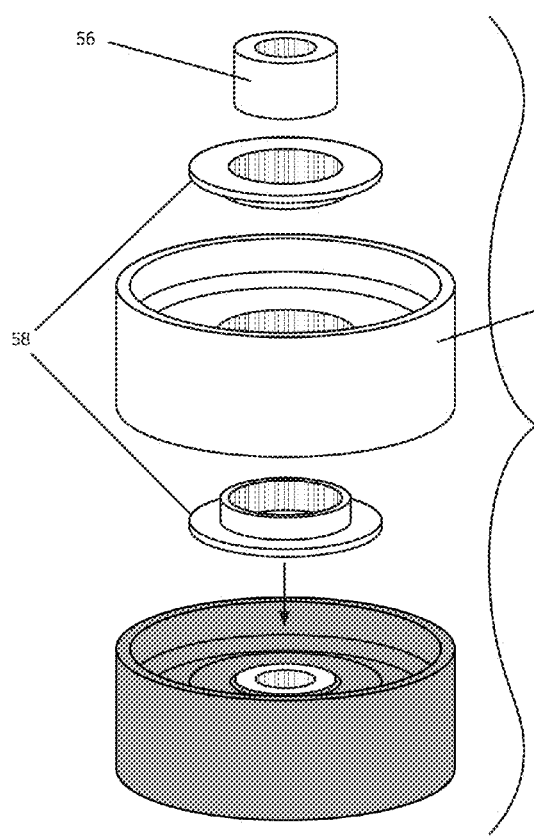
FIGS. 17 and 18 show exemplary bearings for use with the anti-winding assembly of the described embodiments.
Figure 18:
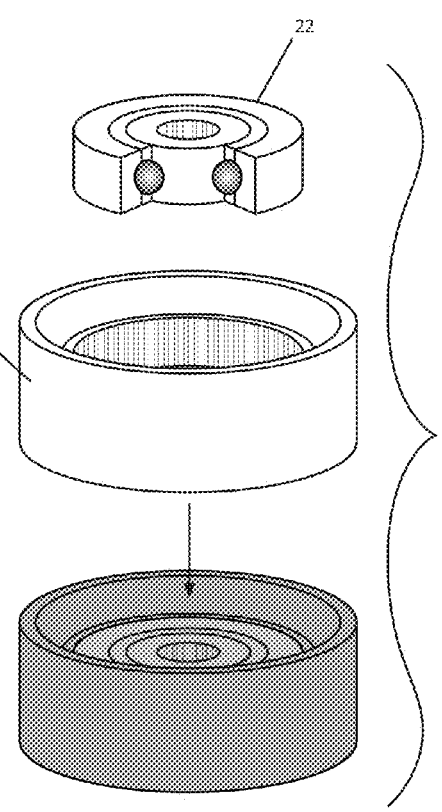

FIGS. 17 and 18 show exemplary bearings 22 for use with the anti-winding assembly of the described embodiments. FIG. 17 shows an exemplary flange bushing, and FIG. 18 shows an exemplary roller bearing. FIG. 17 is a split bushing system that rides on a metal spacer that acts as an inner bearing race. The outer shell extension donut houses the bushings and together form the slip ring. FIG. 18 incorporates an assembly of a ball bearing and outer donut shell to form a slip ring. The bearing can be pressed in or molded in.

Figure 19:
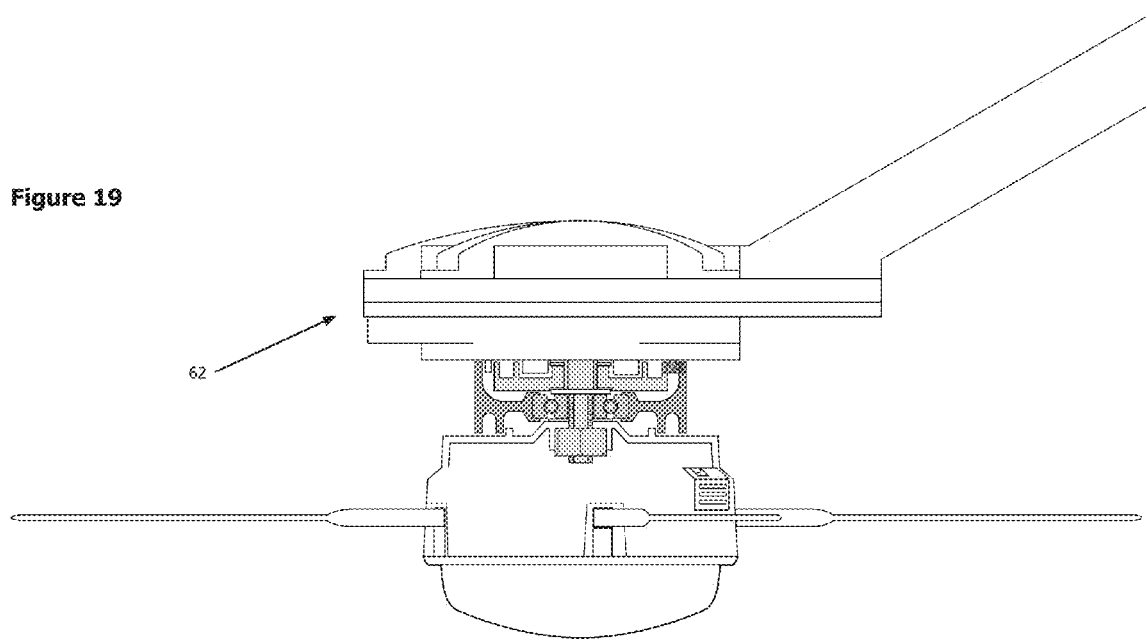
FIG. 19 illustrates an exemplary application of the anti-winding assembly to a trimmer including a flat motor.

FIG. 19 illustrates an exemplary application of the anti-winding assembly to a trimmer including a flat motor 62.

In the described embodiments, variations of the anti-wind system include a first anti-wind system preferably disposed on top of the head between the stationary arbor gearbox/motor housings and the rotating head. The first system uses a slip ring assembly as a shield that shields pinching gaps while isolating power that could transfer to the strands. Circular ledges may be used on the upper arbor gearbox/motor housings, and on the head as shown in FIGS. 9-11. A second anti-wind system is preferably disposed between the rotating cap and the freewheeling glider using a shield in the form of ledges that shield pinching gaps while power is effectively shielded in concert with the freewheeling outer race of the bearing.

The described embodiments provide a practical and inexpensive solution to long-standing problem with trimmer operation. The bearings can be attached independently or combined within other components to meet specific fitting needs. The system can be utilized for original equipment installation, or provided as an aftermarket product to specially fit common trimmers.

The use of bearings with a free-wheeling outer race or surface prevents the initial gap pinching or binding at one end of trimmed long vegetation strands, reduces the rate of wrapping accumulations, and enables easy withdrawal of loosely accumulated strand wrappings. The system reduces or eliminates the binding of one end of the vegetation strand by shielding gaps where it may catch or pinch, and by shielding vegetation strands from rotating parts (under power) with the free-wheeling outer race of the bearing. While loose windings may accumulate, they are not rigidly bound to the rotating member under power, providing for easier hand removal. That is, the free-wheeling outer surface of the bearing effectively reduces the rate of accumulation of wrappings because it disconnects the windings from the rotating arbor shaft that is under power. As such, tightening of the strands is eliminated.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An anti-winding assembly for a trimmer, the trimmer including a trimmer head mounted to a rotatable arbor and supporting one or more cutting lines, the anti-winding assembly comprising:
an adjacent trimmer component attachable to and cooperable with the trimmer;
a bearing positionable between the trimmer head and the adjacent trimmer component, the bearing including a freely rotating outer race; and
a shield positioned radially outward of the bearing adjacent the outer race, the shield being positionable to cover gaps between the bearing and the trimmer head and between the bearing and the adjacent trimmer component, wherein the bearing further comprises an inner race connectable to and rotatable with the rotatable arbor, and wherein the outer race is rotatable relative to the inner race.

2. The anti-winding assembly according to claim 1 in combination with a trimmer including a trimmer head, wherein the trimmer head comprises a trimmer head cover, and the shield is integral with the trimmer head cover.

3. The combination according to claim 1, wherein the shield comprises a first ring integral with the trimmer head cover and a second ring integral with the adjacent trimmer component.

4. The anti-winding assembly according to claim 1, wherein the shield is connected to the outer race.

5. The anti-winding assembly according to claim 4, wherein the trimmer component comprises a gear box housing, and wherein the shield comprises a shield member cooperatively engaged with the gear box housing.

6. The anti-winding assembly according to claim 5, wherein the shield member engages an outside surface of the gear box housing, overlapping ends of the gear box housing.

7. The anti-winding assembly according to claim 5, wherein the shield member engages an inside surface of the gear box housing, and wherein ends of the gear box housing overlap the shield member.

8. The anti-winding assembly according to claim 5, wherein the shield member is engaged with the gear box housing in a butt joint with ends of the gear box housing.

9. An anti-winding assembly for a trimmer, the trimmer including a trimmer head mounted to a rotatable arbor and supporting one or more cutting lines, the anti-winding assembly comprising:
an adjacent trimmer component attachable to and cooperable with the trimmer;
at least one bearing positionable between the trimmer head and the adjacent trimmer component, the bearing including a freely rotating outer race; and
a shield positioned radially outward of the bearing adjacent the outer race, the shield being positionable to cover gaps between the bearing and the trimmer head and between the bearing and the adjacent trimmer component,
wherein the adjacent trimmer component comprises a glider disk rotatably mountable to a distal end of the trimmer head, the at least one bearing comprising a plurality of bearings stacked between the trimmer head and the glider disk.

10. A trimmer comprising:
a rotating trimmer head mounted to a rotatable arbor;
at least one cutting line coupled with the trimmer head;
a trimmer component disposed adjacent the trimmer head; and
an anti-winding assembly that prevents debris from winding between the trimmer head and the trimmer component, the anti-winding assembly including:
a bearing positioned between the trimmer head and the trimmer component, the bearing including a freely rotating outer race, and
a shield positioned radially outward of the bearing adjacent the outer race, the shield covering gaps between the bearing and the trimmer head and between the bearing and the trimmer component, wherein the bearing further comprises an inner race connectable to and rotatable with the rotatable arbor, and wherein the outer race is rotatable relative to the inner race.

11. The trimmer according to claim 10, wherein the shield is integral with a trimmer head cover.

12. The trimmer according to claim 11, wherein the shield comprises a first ring integral with the trimmer head cover and a second ring integral with the trimmer component.

13. The trimmer according to claim 10, wherein the shield is connected to the outer race.

14. The trimmer according to claim 13, wherein the trimmer component comprises a gear box housing, and wherein the shield comprises a shield member cooperatively engaged with the gear box housing.

15. The trimmer according to claim 10, wherein the trimmer component comprises a glider disk rotatably mounted on a ground side of the trimmer head and a drive box housing disposed on an opposite side of the trimmer head, the trimmer including two anti-winding assemblies respectively acting between the glider disk and the trimmer head and between the drive box housing and the trimmer head.

16. A trimmer comprising:
a rotating trimmer head;
at least one cutting line coupled with the trimmer head;
a trimmer component disposed adjacent the trimmer head; and
an anti-winding assembly that prevents debris from winding between the trimmer head and the trimmer component, the anti-winding assembly including:
a bearing positioned between the trimmer head and the trimmer component, the bearing including a freely rotating outer race, and
a shield positioned radially outward of the bearing adjacent the outer race, the shield covering gaps between the bearing and the trimmer head and between the bearing and the trimmer component,
wherein the trimmer component comprises a glider disk rotatably mounted to a distal end of the trimmer head, the anti-winding assembly comprising a plurality of bearings stacked between the trimmer head and the glider disk, the plurality of bearings acting as spacers to adjust a trimming height.

* * * * *